(12) United States Patent
Li (10) Patent No.: US 7,830,857 B2
(45) Date of Patent: Nov. 9, 2010

(54) CREDIT-BASED WIRELESS NETWORK SCHEDULING

(75) Inventor: Jinhui Li, Macungie, PA (US)

(73) Assignee: Agere Systems Inc., Allentown, PA (US)

(*) Notice: Subject to any disclaimer, the term of this patent is extended or adjusted under 35 U.S.C. 154(b) by 1168 days.

(21) Appl. No.: 11/427,476

(22) Filed: Jun. 29, 2006

(65) Prior Publication Data

US 2008/0002582 A1   Jan. 3, 2008

(51) Int. Cl.
*H04J 3/24* (2006.01)

(52) U.S. Cl. .................. 370/349; 370/345; 370/348; 370/389; 370/395.4

(58) Field of Classification Search ............ 370/349, 370/345, 348, 389, 395.4
See application file for complete search history.

(56) References Cited

U.S. PATENT DOCUMENTS

| | | | | |
|---|---|---|---|---|
| 5,946,297 | A * | 8/1999 | Calvignac et al. | 370/230 |
| 6,993,006 | B2 * | 1/2006 | Pankaj | 370/342 |
| 2002/0061007 | A1 * | 5/2002 | Pankaj | 370/342 |
| 2004/0031056 | A1 * | 2/2004 | Wolff | 725/110 |
| 2005/0111461 | A1 | 5/2005 | Khan et al. | |
| 2006/0026192 | A1 | 2/2006 | Li et al. | |
| 2006/0117054 | A1 | 6/2006 | Li et al. | |

OTHER PUBLICATIONS

A. Jalali et al., "Data Throughput of CDMA-HDR a High Efficiency-High Data Rate Personal Communication Wireless System," Proceedings of IEEE VTC 2000, pp. 1854-1858, May 2000.

S.S. Panwar et al., "Golden Ratio Scheduling for Flow Control with Low Buffer Requirements," IEEE Transactions on Communictions, vol. 40, No. 4, pp. 765-772, Apr. 1992.

M. Andrews et al., "Providing Quality of Service Over a Shared Wireless Link," IEEE Communication Magazine, vol. 39, pp. 150-154, Feb. 2001.

U.S. Appl. No. 11/415,831, filed May 1, 2006 C.W. Hamilton et al., "Wireless Network Scheduling Methods and Apparatus Based on Both Waiting Time and Occupancy."

U.S. Appl. No. 11/415,546, filed May 1, 2006 C.W. Hamilton et al., "High-Throughput Scheduler with Guaranteed Fairness for Wireless Networks and Other Applications."

* cited by examiner

*Primary Examiner*—Joseph H Feild
*Assistant Examiner*—Huy D Nguyen
(74) *Attorney, Agent, or Firm*—Ryan, Mason & Lewis, LLP (57) ABSTRACT

A scheduler having improved fairness is disclosed, for scheduling packets or other data blocks for transmission from a plurality of transmission elements in timeslots in a communication system. The scheduler determines credit measures for respective ones of the transmission elements, with each of said credit measures being a function of a reserved portion of an available bandwidth and a scheduled portion of said available bandwidth for a corresponding one of the transmission elements. The scheduler selects one or more of the transmission elements for scheduling in a given one of the timeslots based on the credit measures. The scheduler in an illustrative embodiment may be implemented in a network processor integrated circuit or other processing device of the communication system.

22 Claims, 4 Drawing Sheets

CREDIT-BASED WIRELESS NETWORK SCHEDULING

RELATED APPLICATIONS

The present application is related to U.S. patent application Ser. No. 11/415,831, filed May 1, 2006 and entitled "Wireless Network Scheduling Methods and Apparatus Based on Both Waiting Time and Occupancy," and Ser. No. 11/415,546, filed May 1, 2006 and entitled "High-Throughput Scheduler with Guaranteed Fairness for Wireless Networks and Other Applications," the disclosures of which are incorporated by reference herein.

FIELD OF THE INVENTION

The present invention relates generally to the field of telecommunications, and more particularly to schedulers used to control access to limited resources.

BACKGROUND OF THE INVENTION

In many telecommunications applications, a scheduler is used to resolve contention among multiple tasks competing for a limited resource. For example, such a scheduler is commonly used in a network processor to schedule multiple traffic flows for transmission over a specific transmission bandwidth.

A network processor generally controls the flow of data between a physical transmission medium, such as a physical layer portion of a network, and a switch fabric in a router or other type of switch. An important function of a network processor involves the scheduling of cells, packets or other data blocks, associated with the multiple traffic flows, for transmission to the switch fabric from the physical transmission medium of the network and vice versa. The network processor scheduler performs this function.

An efficient and flexible scheduler architecture capable of supporting multiple scheduling algorithms is disclosed in U.S. patent application Ser. No. 10/722,933, filed Nov. 26, 2003 in the name of inventors Asif Q. Khan et al. and entitled "Processor with Scheduler Architecture Supporting Multiple Distinct Scheduling Algorithms," which is commonly assigned herewith and incorporated by reference herein.

It is often desirable for a given scheduling algorithm implemented in a network processor or other processing device to be both simple and fair. Simplicity is important because the processing device hardware typically does not have a large amount of time to make a given scheduling decision, particularly in a high data rate environment. A good scheduler should also be fair. For example, it may allocate the bandwidth according to the weights of the users, with the higher-priority users getting more bandwidth than lower-priority users.

An example of a simple and fair scheduling algorithm is the Weighted Round-Robin (WRR) scheduling algorithm. Assume that in a given telecommunications application there is a number of users competing for one resource, which can process one data block in each timeslot. The scheduler must decide which user can send one data block to the server in each timeslot. Each user has a weight to indicate its priority. The user with larger weight has higher priority. Under ideal conditions, the services received by the users should be proportional to their weights. A WRR scheduler serves the users in proportion to their weights in a round-robin fashion.

A problem with WRR is that it may cause long periods of burstiness. This is clearly not desirable in telecommunication systems, because long burstiness could overflow the buffers of user communication devices. Such burstiness becomes increasingly problematic in those practical applications in which the total number of users may be several hundreds or more.

Alternative scheduling algorithms are known which overcome the burstiness problem of WRR. These include, by way of example, Weighted Fair Queuing (WFQ) and Worst-case Fair Weighted Fair Queuing (WF$^2$Q). Unfortunately, these alternative algorithms are typically considerably more complex than WRR, and therefore may be difficult to implement in network processors and other processing devices operating in high data rate environments.

U.S. patent application Ser. No. 10/903,954, filed Jul. 30, 2004 in the name of inventors Jinhui Li et al. and entitled "Frame Mapping Scheduler," which is commonly assigned herewith and incorporated by reference herein, discloses in an illustrative embodiment a frame mapping scheduler that provides simplicity and fairness comparable to that of WRR, but without the burstiness problem commonly associated with WRR. More specifically, a frame mapping scheduler in the illustrative embodiment described therein comprises scheduling circuitry which utilizes a weight table and a mapping table. The weight table comprises a plurality of entries, with each of the entries identifying a particular one of the transmission elements. The mapping table comprises at least one entry specifying a mapping between a particular timeslot of a frame and an entry of the weight table. The scheduling circuitry determines a particular transmission element to be scheduled in a given timeslot by accessing a corresponding mapping table entry and utilizing a resultant value to access the weight table. The mapping table entries may be predetermined in accordance with a golden ratio policy, or other type of policy.

However, in schedulers which utilize a golden ratio policy, or more generally any policy that requires a stored mapping table, the mapping table may be large and therefore require substantial amounts of memory. It is usually preferred that such mapping table memory be arranged "on-chip," that is, on the same integrated circuit as the scheduler, so as to reduce access times. For example, such an arrangement is beneficial in network processing applications in which data blocks may need to be processed substantially in real time.

U.S. patent application Ser. No. 10/998,686, filed Nov. 29, 2004 in the name of inventors Jinhui Li et al. and entitled "Frame Mapping Scheduler with Compressed Mapping Table," which is commonly assigned herewith and incorporated by reference herein, discloses techniques for compressing the mapping table in order to reduce the amount of memory required to store the table, thereby facilitating its implementation in a network processor integrated circuit or other device comprising a frame mapping scheduler.

The known arrangements described above can be utilized in a wide variety of telecommunications applications, including applications involving wireless networks. However, scheduling in the wireless network context can be particularly challenging because channel capacities in a wireless network are typically time varying and difficult to predict. It is important in such situations that the wireless network scheduler provides not only fairness, but also sufficient throughput.

Examples of scheduling algorithms utilized in the wireless network context include the above-described WRR scheduling algorithm and its unweighted counterpart round robin (RR), maximum carrier-to-interference ratio (Max C/I), Proportional Fairness (PF) and Modified Largest Weighted Delay First (M-LWDF).

A drawback of the RR scheduling algorithm is that it does not consider the channel conditions. Instead, the RR scheduling algorithm simply schedules backlogged users one by one, with the first user being assigned to the first timeslot, the second user being assigned to the second timeslot, and so on, regardless of their respective channel capacities. Such an approach is fair, because in a given set of N timeslots, each of N users has exactly one chance to be served. However, the throughput of the RR algorithm is poor, because it does not check the channel capacities before it makes the scheduling decisions. The WRR scheduling algorithm similarly fails to take channel capacities into account in its scheduling decisions.

The Max C/I scheduling algorithm selects for a given timeslot the user that has the best channel capacity. Although this approach can achieve the maximum overall throughput, its fairness performance is very poor. For example, if the wireless link of a given mobile user is constantly weak, that user is not likely to be scheduled.

The PF scheduling algorithm selects the user that has the maximum $r_i/R_i$, where $r_i$ is the channel capacity of user i and $R_i$ is the average rate received by user i. The algorithm updates $R_i$ adaptively. Thus, mobile users with weak wireless links will have opportunities to be scheduled. Additional details regarding the PF scheduling algorithm can be found in, for example, A. Jalali et al., "Data throughput of CDMA-HDR a high efficiency high data rate personal communication wireless system," in Proc. of IEEE VTC 2000, pp. 1854-1858, May 2000. The fairness of the PF scheduling algorithm is better than that of the Max C/I scheduling algorithm, but not as good as that of the RR or WRR scheduling algorithms. Also, the PF scheduling algorithm cannot provide guaranteed fairness.

The M-LWDF scheduling algorithm gives higher priorities to the users that have longer waiting times. However, like the above-described PF scheduling algorithm, it fails to provide guaranteed fairness.

Accordingly, the Max C/I, PF and M-LWDF scheduling algorithms provide better throughput than the RR and WRR scheduling algorithms in the wireless context by sacrificing fairness.

The above-cited U.S. patent application Ser. No. 11/415, 546 provides improved scheduling algorithms which exhibit a better balance between throughput and fairness, particularly in wireless network applications. In an illustrative embodiment, the algorithm is referred to as a Wireless RR (WiRR) scheduling algorithm. In this embodiment, all transmission elements are initially designated as eligible for service in a given frame, but once a particular transmission element is served in a timeslot of the given frame, it is considered ineligible for service in any subsequent timeslots of that frame. The process is repeated for additional frames, and for each new frame the transmission elements are all initially designated as eligible to transmit one or more data blocks in that frame.

Further improvements are provided in the above-cited U.S. patent application Ser. No. 11/415,831, which overcomes certain disadvantages of the conventional M-LWDF scheduling algorithm. For example, the M-LWDF algorithm generally has a queue length which, although bounded under admissible arrivals, may be quite large, and therefore the queues may be difficult to implement in network processor integrated circuits or other types of hardware. The cited application discloses scheduling algorithms that can be implemented using shorter queues, and thus with reduced amounts of memory and other hardware resources, relative to conventional scheduling algorithms such as M-LWDF.

Despite these advances, a need remains for further improvements in scheduling algorithms, particularly in the wireless context. For example, conventional M-LWDF typically gives higher priorities to the users that have longer waiting times. This means that M-LWDF rewards "greedy" users, in that the users that send more traffic will get more bandwidth. On the other hand, the users that strictly conform to reservations would get less bandwidth. Such a situation may be viewed as unfair, and it would be desirable if a scheduling algorithm were available that alleviated this type of unfairness.

SUMMARY OF THE INVENTION

A wireless scheduler is disclosed that in an illustrative embodiment tracks the credit of each user to make sure that greedy users are regulated. This credit-based approach provides enhanced fairness relative to conventional arrangements such as the above-noted M-LWDF scheduling algorithm.

In accordance with one aspect of the invention, a scheduler is configured to schedule packets or other data blocks for transmission from a plurality of transmission elements in timeslots in a communication system. The scheduler determines credit measures for respective ones of the transmission elements, with each of said credit measures being a function of a reserved portion of an available bandwidth and a scheduled portion of said available bandwidth for a corresponding one of the transmission elements. The scheduler selects one or more of the transmission elements for scheduling in a given one of the timeslots based on the credit measures. For example, the scheduler may select for scheduling in the given timeslot a particular one of the transmission elements having a highest credit measure of the credit measures of the plurality of transmission elements. The process may be repeated for one or more additional timeslots. The timeslots may, but need not, be timeslots of a frame in the communication system.

In an illustrative embodiment, the credit measures are given by $C_i$, for values of i=1 to N, where N denotes the number of transmission elements in the plurality of transmission elements. The scheduler in this embodiment may select for scheduling in the given timeslot a particular one of the transmission elements having a highest value of $r_iC_i$, where $r_i$ is channel capacity of transmission element i.

The credit measures may be initialized to respective designated values prior to selecting a particular one of the transmission elements for scheduling in the given timeslot. For example, the credit measures of the N transmission elements may be initialized by setting the credit measures $C_i$ equal to respective designated values $C^0_i$, where $C^0_i \geq 0$. Alternatively, each of the N transmission elements may have the same initial value for its credit measure.

The credit measures of the N transmission elements may be updated in accordance with the equation $C_i = C_i + \phi_i \Delta t - S_i$, where $\phi_i$ is a reserved rate of transmission element i, $\Delta t$ is timeslot duration, and $S_i$ is a number of bits scheduled from transmission element i. Numerous other updating arrangements taking into account reserved and scheduled portions of an available bandwidth for a particular user or other transmission element may be used.

The credit measures in the illustrative embodiments may be constrained to have non-negative values and to not exceed designated maximum values. Moreover, if a particular one of the transmission elements does not have one or more data blocks to be scheduled for transmission, its credit measure if greater than its initial value may be reset to its initial value.

The scheduling algorithms are particularly well suited for use in wireless network applications, but can also be utilized in numerous other applications.

In accordance with another aspect of the invention, two or more of the transmission elements may be selected for scheduling in the given timeslot based on the selected transmission elements having substantially the same credit measures. In such a "tie" situation, the two or more selected transmission elements may all be scheduled in the given timeslot by assigning different subsets of a set of available codes to different ones of the selected transmission elements. For example, the timeslots may comprise HSDPA timeslots each having an available set of codes. In such an arrangement, multiple users can be scheduled in a given one of the HSDPA timeslots by assigning different codes to the users.

The scheduler in an illustrative embodiment may be implemented in a network processor integrated circuit or other processing device of the communication system, using a wide variety of different arrangements of scheduling circuitry.

Advantageously, the scheduling algorithms described in conjunction with the illustrative embodiments overcome the greedy user problem associated with the conventional M-LWDF scheduling algorithm, thereby providing improved fairness.

DETAILED DESCRIPTION OF THE INVENTION

The invention will be illustrated herein in conjunction with exemplary wireless networks and other types of communication systems. The exemplary systems include respective schedulers configured in a particular manner in order to illustrate the techniques of the invention. It should be understood, however, that the invention is more generally applicable to any communication system scheduler in which it is desirable to provide improved performance relative to the conventional scheduling algorithms described above.

Figure 1:
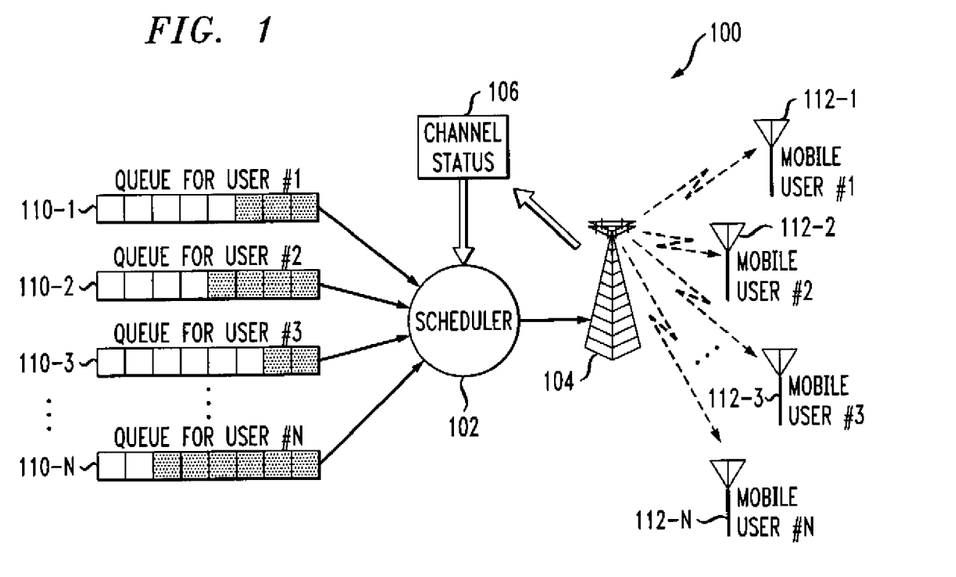
FIG. 1 is a simplified block diagram of a communication system comprising a wireless network in an illustrative embodiment of the present invention.

FIG. 1 shows a simplified diagram of a communication system 100 in accordance with an illustrative embodiment of the invention. The system 100 comprises a scheduler 102 coupled to a transmitter 104 and a channel status element 106. The scheduler is coupled to transmission elements which in this embodiment comprise respective queues 110-1, 110-2, . . . 110-N for respective ones of N users. In this example, the N users are mobile users of a wireless network of the system 100, and are associated with respective mobile user devices 112-1, 112-2, . . . 112-N which communicate with transmitter 104 in a conventional manner. The transmitter 104 may comprise, for example, at least a portion of a base station or access point of the wireless network.

The wireless network is configured for communication of packets or other arrangements of data between transmitter 104 and the mobile user devices 112. All such arrangements of data are intended to be encompassed by the general term "data block" as used herein. It is to be appreciated that the invention does not require any particular size or configuration of data blocks. For simplicity and clarity of illustration, the diagram shows only the downlink communication between transmitter 104 and the mobile user devices 112, although it is to be appreciated that similar techniques may be used for other types of transmission.

The system 100 in this embodiment maintains one queue 110 for each mobile user 112, although other types of queuing arrangements may be used. Downlink transmissions are assumed to occur in timeslots. The timeslots may be timeslots of a frame, but the invention does not require that the timeslots be timeslots of a frame. During each timeslot, the scheduler 102 serves one or more of the users. The scheduler in this embodiment is assumed to have knowledge of the wireless channel capacities associated with the respective mobile users. This knowledge may be provided to the scheduler by the channel status element 106, or using other techniques. As indicated previously, the channel capacities associated with the mobile users are typically time varying and difficult to predict. The scheduler bases its scheduling decisions on the actual measured channel conditions and other parameters, as will be described in greater detail below in conjunction with the flow diagram of FIG. 3. For a given timeslot, the scheduler selects one or more of the user queues 110 which will each be scheduled to transmit a packet during that timeslot. A given packet is transmitted via transmitter 104 to the corresponding one of the mobile user devices 112.

Figure 2:
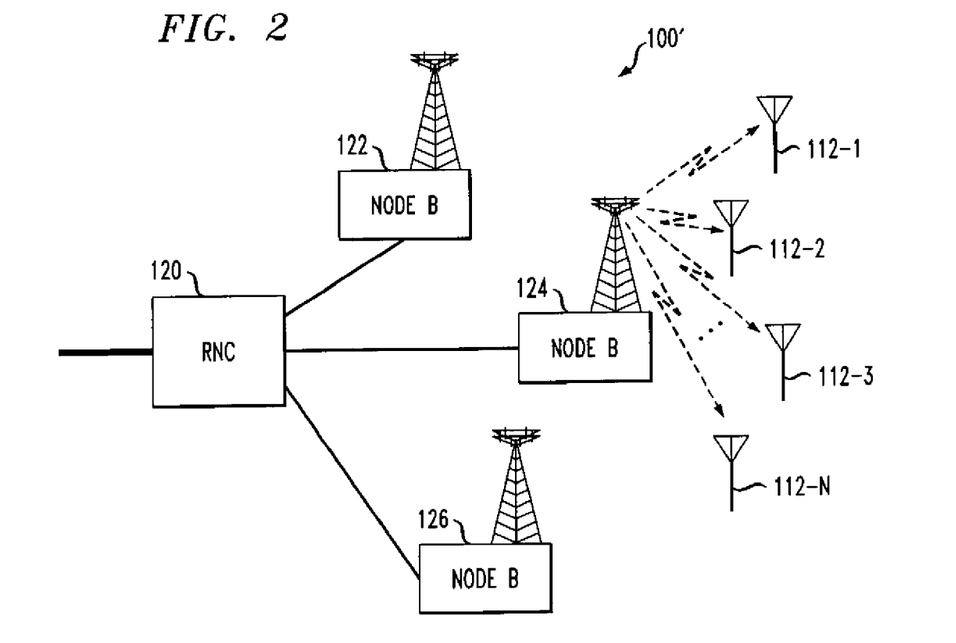
FIG. 2 shows one possible implementation of at least a portion of the communication system of FIG. 1.

The system 100 of FIG. 1 may be implemented, for example, as an otherwise conventional Universal Mobile Telecommunications System (UMTS) or Wideband Code Division Multiple Access (WCDMA) wireless cellular communication system. In such an implementation, system 100' as shown in FIG. 2 comprises a radio network controller (RNC) 120 coupled to base stations 122, 124 and 126 as shown. The base stations 122, 124 and 126 are referred to as Node B elements in accordance with well-known UMTS and WCDMA nomenclature. These elements communicate with the mobile user devices 112, which are referred to as user equipment (UE) elements in the UMTS and WCDMA context. The scheduler 102 and channel status element 106 of the FIG. 1 system may be incorporated in the RNC 120, or may be replicated in each of the Node B elements 122, 124 and 126. For example, if the UMTS or WCDMA system 100' is configured to provide high speed downlink packet access (HSDPA) capability, a scheduler is typically arranged in each Node B element so as to permit fast scheduling.

The above-noted HSDPA capability utilizes timeslots referred to as transmission time intervals (TTIs), and one or more users can be served within each TTI. The HSDPA feature can be provided in a frequency division duplex (FDD) mode or a time division duplex (TDD) mode. In the FDD mode, a given TTI has a duration of 2 milliseconds (ms), while in the TDD mode, a given TTI could be 5 ms or 10 ms. These and other TTIs are intended to be encompassed by the general term "timeslot" as used herein.

In the UMTS or WCDMA context, the communication system channel typically used in HSDPA to send data to the UEs from a given Node B is referred to as the high speed downlink shared channel (HS-DSCH).

For simplicity and clarity of illustration, the scheduler 102 as described below will be assumed to serve a single user per timeslot, but it should be understood that the described techniques can be extended in a straightforward manner to accommodate HSDPA and other arrangements in which multiple users can be scheduled in a single timeslot.

It should also be pointed out that the particular arrangements of elements shown in FIGS. 1 and 2 are by way of illustrative example only. More specifically, as previously noted, the invention can be implemented in any type of wireless network or other communication system, and is not limited to any particular communication application.

The scheduler 102 is configured to schedule packets or other data blocks for transmission from the user queues 110 in timeslots. The scheduler in the illustrative embodiments implements scheduling algorithms which consider credit measures, so as to provide effective regulation of greedy users.

Generally, the scheduler 102 determines credit measures for respective ones of the N queues 110 of FIG. 1, with each of the credit measures being a function of a reserved portion of an available bandwidth and a scheduled portion of said available bandwidth for a corresponding one of the queues. The scheduler then selects one or more of the queues for scheduling in a given one of the timeslots based on the credit measures. For example, the scheduler may select for scheduling in the given timeslot a particular one of the queues having a highest credit measure of the credit measures of the plurality of queues. These operations are typically repeated for additional timeslots. In alternative embodiments, transmission elements other than queues may be used. The transmission elements may also be referred to herein as "users" in describing the exemplary scheduling algorithms below. Thus, operations described below as being performed with reference to a user may be considered as being performed with reference to the associated transmission element, and vice-versa.

The scheduling algorithms in the illustrative embodiments provide improvements relative to the above-mentioned conventional M-LWDF scheduling algorithm. The M-LWDF scheduling algorithm is described in greater detail in M. Andrews et al., "Providing Quality of Service over a Shared Wireless Link," IEEE Communication Magazine, Vol. 39, pp. 150-154, February 2001, which is incorporated by reference herein.

In each timeslot, the M-LWDF scheduling algorithm picks the user that has the maximum $(\alpha_i W_i r_i)$, where $\alpha_i$ is a bandwidth allocation constant for user i, $W_i$ is the waiting time of a head-of-line packet in queue i, and $r_i$ is the channel capacity associated with user i. It is known that the conventional M-LWDF scheduling algorithm is "throughput optimal," which means that it can guarantee bounded or finite queue lengths. This throughput optimality property is preserved if $W_i$ is replaced with $O_i$, the occupancy of the queue. As indicated previously, a problem with M-LWDF is that the queue lengths, although bounded, are often quite long, and therefore can consume excessive memory and other hardware resources in a given implementation. This queue length problem is addressed and solved by arrangements described in the above-cited U.S. patent application Ser. No. 11/115,831, which simultaneously consider both waiting time and queue occupancy in making the scheduling decisions. As noted above, this allows queue size to be reduced, thereby conserving memory and other hardware resources.

It was mentioned previously herein that another problem with the conventional M-LWDF algorithm relates to its failure to regulate greedy users. Such users may be scheduled a larger portion of an available bandwidth than they would otherwise be entitled to based on their respective reserved portions of that available bandwidth. In other words, by sending amounts of traffic for scheduling that are in excess of their respective reservations, the greedy users obtain larger portions of the available bandwidth at the expense of those users that strictly conform to their respective reservations. The present invention in its illustrative embodiments addresses and solves this greedy user problem.

More particular examples of the improved scheduling algorithms will now be described with reference to the flow diagrams of FIGS. 3 and 4. The scheduling algorithms in these examples advantageously provide improved fairness through an ability to regulate greedy users.

Figure 3:
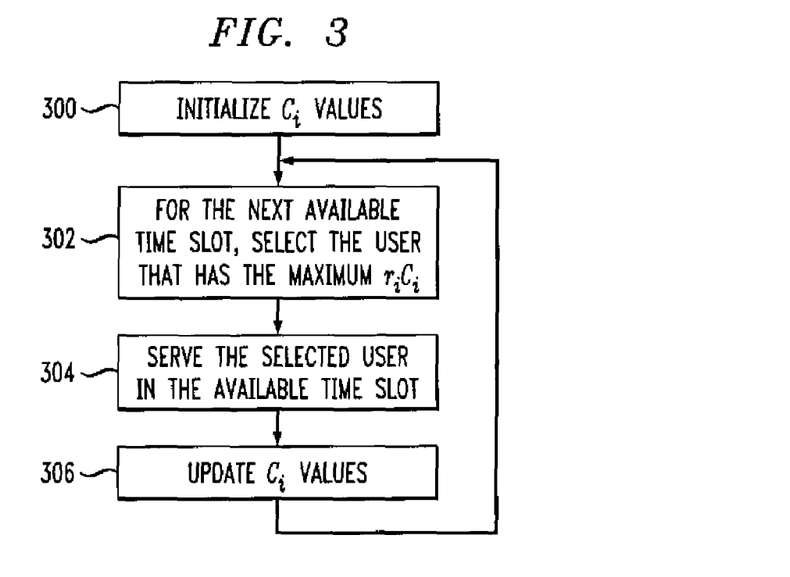
FIG. 3 is a flow diagram of an improved wireless scheduling algorithm implemented in a scheduler of the FIG. 1 communication system in one embodiment of the present invention.

Referring initially to FIG. 3, the operation of a first version of the improved scheduling algorithm, as implemented by scheduler 102 in system 100 of FIG. 1, is shown. In this version, the timeslots are assumed to be entirely independent and not part of a frame.

In step 300, credit measures are initialized for respective users. The credit measures in this particular example are given by $C_i$, for values of i=1 to N, where as noted above N denotes the number of transmission elements 110. The transmission elements are referred to as "users" in the context of this example. The credit measures are initialized to respective designated values in this example by setting the credit measures $C_i$ equal to respective designated values $C^0_i$, where $C^0_i \geq 0$. Thus, two or more of the users may have different initial values for their respective credit measures. In other embodiments, the users to be scheduled may all have the same initial values for their respective credit measures. That is, $C^0_i$ may be set to a single value $C^0$ for all users that are to be scheduled.

In step 302, for the next available timeslot, the scheduler 102 selects the particular one of the N users that has the maximum value of $r_i C_i$ among the N users, where $r_i$ denotes the channel capacity associated with user i. This available timeslot is also referred to herein as the current timeslot.

In these and other examples described herein, it is assumed for simplicity and clarity of illustration that all of the N users are backlogged at all times. Users are considered backlogged if they have at least one packet to transmit. With reference to the diagram of FIG. 1, it can be seen that each of the users illustrated, namely, users 1, 2, 3 and N, is backlogged in that each has at least one packet in its associated queue.

The foregoing backlogged user assumption, and other assumptions made herein, need not apply in other embodiments. For example, in alternative embodiments users that are not backlogged in the current timeslot may be removed from consideration in the scheduling process for that timeslot, as will be appreciated by those skilled in the art. However, it should be understood that users that are not backlogged in the current timeslot may become backlogged in the next timeslot, and so removing such users from consideration in scheduling the current timeslot should not be construed as removing them from consideration for other timeslots.

In step 304, the selected user is served in the available timeslot. The selected user is "served" in this example by scheduling a packet from the corresponding user queue 110 for transmission in the available timeslot.

In step 306, the values of the credit measures $C_i$ are updated after a particular one of the users has been selected for scheduling in the current timeslot. The credit measures of the N users may be updated, by way of example, in accordance with the equation $C_i=C_i+\phi_i\Delta t-S_i$, where $\phi_i$ is a reserved rate of transmission element i, $\Delta t$ is timeslot duration, and $S_i$ is a number of bits scheduled from transmission element i. The product $\phi_i\Delta t$ is an example of a reserved portion of an available bandwidth for a given user, although other quantities indicative of reserved portion of an available bandwidth may be used. Similarly, the quantity $S_i$ may be replaced in other embodiments with other quantities indicative of a scheduled portion of an available bandwidth for a given user. It was noted above that a given user may be greedy by submitting traffic for scheduling that is in excess of a reserved portion of an available bandwidth for that user, such that the user actually receives a scheduled portion of the available bandwidth that is larger than its reserved portion. The present embodiment utilizes credit measures which advantageously take such discrepancies into account in the scheduling process, so as to prevent the greedy users from obtaining excessive scheduled portions of the available bandwidth at the expense of those users that conform to their respective reservations.

After the updating of the $C_i$ values in step 306, the process returns to step 302 to determine the scheduling for the next timeslot.

The credit measures may be constrained to have non-negative values. Thus, whenever a given $C_i$ value would be negative as a result of an update process or other computation, that value may instead be set to zero, i.e., if $C_i<0$, let $C_i=0$.

The credit measures may also be constrained so as not to exceed designated maximum values. This advantageously prevents a user from accumulating a large credit. For example, the maximum credit for user i may be denoted $C^{max}_i$, such that if a given $C_i$ value would exceed $C^{max}_i$ as a result of an update process or other computation, that value may instead be set to $C^{max}_i$, i.e., when $C_i>C^{max}_i$, set $C_i=C^{max}_i$. Thus, the range of $C_i$ is $[0, C^{max}_i]$. $C^{max}_i$ may be viewed as representing the maximum burstiness of user i.

Two or more of the users may have different maximum values for their respective credit measures. In other embodiments, the users to be scheduled may all have the same maximum values for their respective credit measures. That is, $C^{max}_i$ may be set to a single value $C^{max}$ for all users that are to be scheduled.

As noted above, the foregoing example assumed that each of the N users was backlogged in the current timeslot. In situations in which one or more of the users are not backlogged, that is, do not have one or more data blocks to be scheduled for transmission, the credit measures of such users may be reset to their respective initial values. For example, if user i corresponds to an empty queue and currently has a credit measure with a value greater than its initial value, i.e., $C_i>C^0_i$, that credit measure may be reset to its initial value, i.e., $C_i$ is set to $C^0_i$. However, if the credit measure $C_i$ is less than the initial value $C^0_i$, it need not be reset to the initial value.

The credit-based scheduling algorithm of the illustrative embodiment tracks the credit of each user to prevent the greedy users from getting more than their fair share of the available bandwidth. Such an algorithm protects users that conform to resource reservations or other agreements, and generally provides better fairness than the conventional M-LWDF algorithm described previously.

A scheduling algorithm of the type described above may be implemented at least in part in the form of one or more software programs running on a network processor or other type of processing device.

Figure 4:
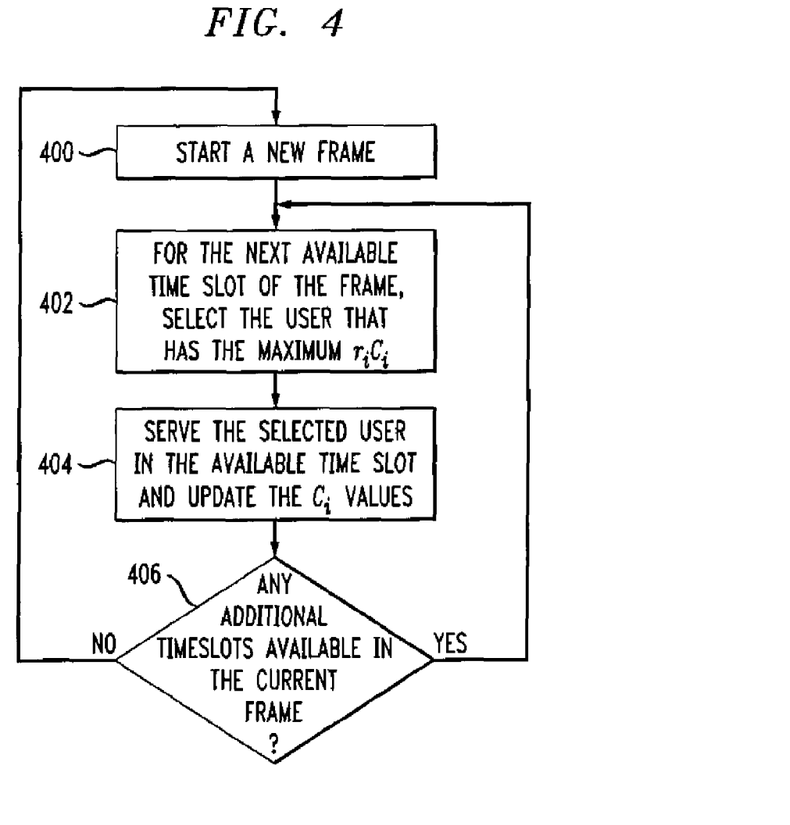
FIG. 4 is a flow diagram showing an alternative version of the FIG. 3 scheduling algorithm.

FIG. 4 shows a version of the credit-based scheduling algorithm configured to operate on timeslots of a frame. The algorithm includes steps 400 through 406 as shown. Steps 402 and 404 correspond collectively to steps 302, 304 and 306 of the FIG. 3 example. Step 400 starts the scheduling process for a new frame. In step 406, a determination is made after scheduling a first timeslot of the current frame as to whether any additional timeslots are available in the current frame. If not, the process returns to step 400 to start a new frame. However, if there are additional timeslots available in the current frame, the process returns to step 402 to schedule one or more of the users in additional timeslots of the current frame.

As noted previously, the present invention does not require that timeslots be part of a frame, and can be applied to timeslots which are entirely separate and independent from one another as in the example of FIG. 3.

When two or more users are determined by the scheduler 102 to have the same maximum $r_iC_i$ in a given instance of step 302 or 402, the tie can be broken randomly, or the user with the smaller index i can be selected. Another technique for dealing with such ties, suitable for use in the above-noted HSDPA context or other contexts in which multiple users can be served in a given timeslot, is to serve the users simultaneously in the given timeslot, as will now be described with reference to FIG. 5.

Figure 5:
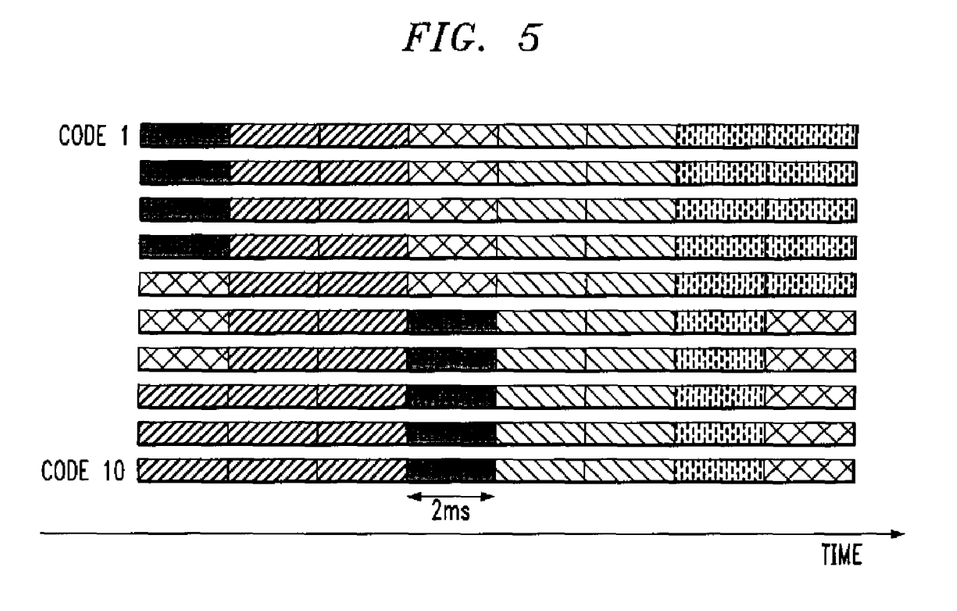
FIG. 5 is a table which shows an example of the operation of the wireless scheduling algorithms of FIGS. 3 and 4 in an HSDPA application.

FIG. 5 shows an example of scheduling of multiple users in each of a number of different HSDPA timeslots. In this example, the set of available codes comprises a set of ten codes, denoted Code 1 through Code 10. Each timeslot comprises an FDD mode TTI having a duration of 2 ms. Different shadings in the figure represent different users. Up to ten different users can be scheduled in a given one of the timeslots, by assigning one or more of the codes to each of the users.

It should be noted that the particular number of codes used in this example is for purposes of illustration only, and more or fewer codes may be used in other embodiments. As indicated above, the HS-DSCH channel is typically used in HSDPA to send data to the mobile users from a given Node B. Up to fifteen codes may be assigned to this channel. Thus, the ten codes shown in FIG. 5 represent just one example of a set of codes that may be used.

In the first timeslot shown in the figure, three users are scheduled, one assigned four codes and two others assigned three codes each. In the second and third timeslots, only a single user is scheduled, and is assigned all ten codes in each timeslot. In the fourth timeslot, two users are scheduled, with each assigned five of the ten available codes. The remaining timeslots shown are scheduled in a similar manner.

The scheduling of multiple users in a single timeslot as described above can be applied in contexts other than HSDPA, and may be implemented using other arrangements of timeslots and codes.

In a typical wireless network, mobile users are frequently removed from or added to a network or a particular cell or other coverage area of the network. The scheduler 102 may be configured to handle users removed or added, during a given frame or otherwise. For users that are removed, the scheduler can simply designate those users as ineligible or otherwise eliminate the users from consideration in the scheduling process. For new users that are added, the scheduler can, by way of example, wait until a new frame starts before making those users eligible, or otherwise adjust eligibility status of the new users.

Advantageously, the scheduling algorithms described in conjunction with the illustrative embodiments of FIGS. 3 to 5 overcome the greedy user problem associated with the convention M-LWDF scheduling algorithm, thereby resulting in improved fairness.

The scheduler 102 may be implemented at least in part in the form of an integrated circuit, as will be described in greater detail below. Such an integrated circuit may comprise a network processor or other type of processor or processing device that is implemented in a given communication system element, such as a base station or access point associated with transmitter 104 in the FIG. 1 system, or an RNC or Node B element in the FIG. 2 system.

The scheduler 102 may be, for example, a frame mapping scheduler, of the type described in the above-cited U.S. patent application Ser. Nos. 10/903,954 and 10/998,686. The use of these techniques can substantially reduce the amount of memory required to store a mapping table for a golden ratio policy or any other policy that requires a stored mapping table.

It should be noted that the scheduling techniques of the present invention may also or alternatively be used in conjunction with a flexible scheduler architecture capable of supporting multiple scheduling algorithms, such as that disclosed in the above-cited U.S. patent application Ser. No. 10/722,933.

As indicated previously, the scheduling algorithms described herein can be implemented in many other types of communication systems. Another example system will now be described with reference to FIGS. 6 through 8. In these figures, a scheduling algorithm is implemented in a scheduler of a network processor. Such a network processor may be used in systems comprising wireless networks as shown in FIGS. 1 and 2, but can also be used in other types of systems, such as the communication system 600 shown in FIG. 6.

Figure 6:
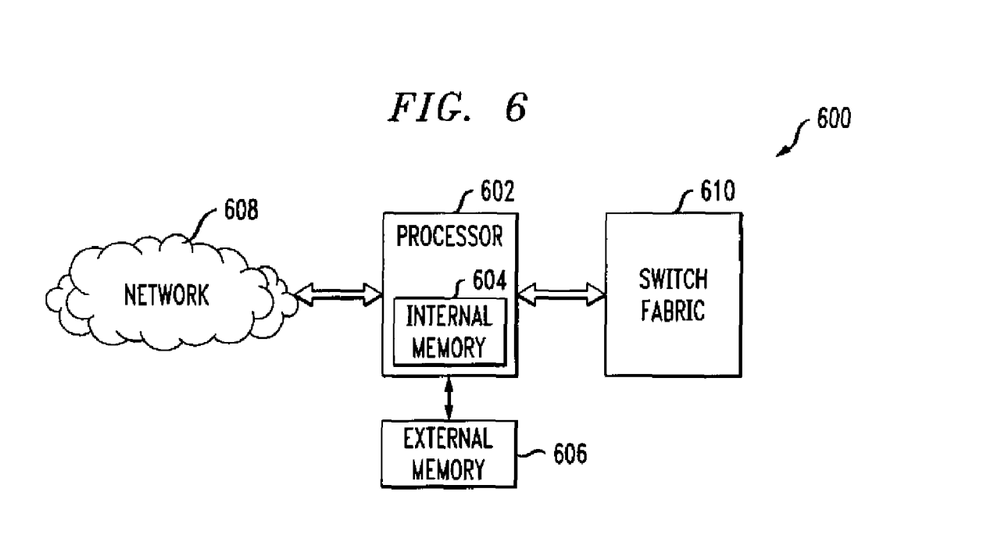
FIG. 6 shows another possible implementation of at least a portion of the FIG. 1 communication system.

The system 600 includes a network processor 602 having an internal memory 604. The network processor 602 is coupled to an external memory 606 as shown, and is configured to provide an interface for communicating packets or other arrangements of data between a network 608 and a switch fabric 610. As noted previously, all such arrangements of data are intended to be encompassed by the general term "data block" as used herein. The network 608 may be a wireless network, corresponding to a portion of one of the wireless networks in the systems of FIGS. 1 and 2, while the network processor 602 and switch fabric 610 may be implemented in base stations, network controllers or other elements such systems.

The network processor 602 and its associated external memory 606 may be implemented, e.g., as one or more integrated circuits installed on a line card or port card of a router, switch or other system element.

Figure 7:
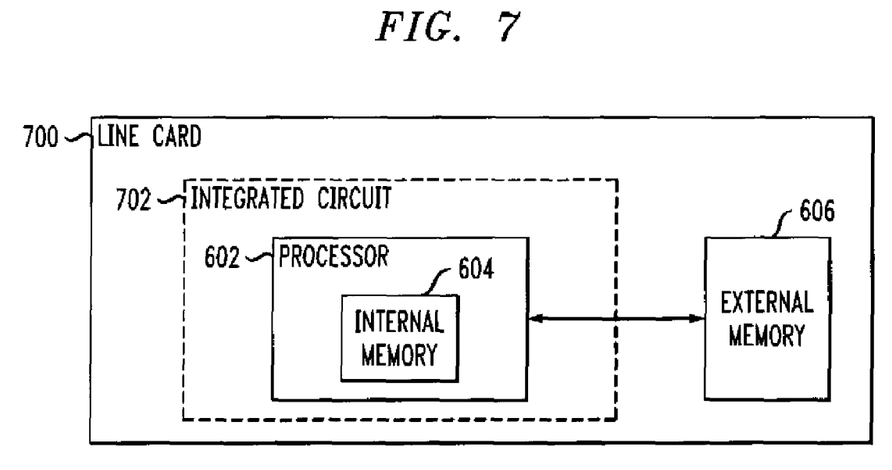
FIG. 7 is a block diagram of a network processor of the FIG. 6 system shown as an integrated circuit installed on a line card of a router or switch.

FIG. 7 illustrates an example line card embodiment of a portion of the system 600 of FIG. 6. In this embodiment, the system comprises a line card 700 having at least one integrated circuit 702 installed thereon. The integrated circuit 702 comprises network processor 602 which has internal memory 604. The network processor 602 interacts with external memory 606 on the line card 700. The external memory 606 may serve, e.g., as an external static random access memory (SRAM) or dynamic random access memory (DRAM) for the network processor integrated circuit 702. Such memories may be configured in a conventional manner, and may be utilized to store scheduling information such as the above-described credit measures. A suitable host processor may also be installed on the line card 700, and used for programming and otherwise controlling the operation of one or more network processor integrated circuits on the line card 700.

The portion of the communication system as shown in FIGS. 6 and 7 is considerably simplified for clarity of illustration. It is to be appreciated, however, that the system may comprise a router, switch or other element which includes multiple line cards such as that shown in FIG. 7, and that each of the line cards may include multiple integrated circuits. A similar embodiment may be implemented in the form of a port card. However, the invention does not require such card-based implementation in a router, switch or other element.

It should also be understood that the particular arrangements of elements shown in FIGS. 6 and 7 are by way of illustrative example only. More specifically, as previously noted, the invention can be implemented in any type of processor or other communication system processing device, and is not limited to any particular network-based processing application.

A "processor" as the term is used herein may be implemented, by way of example and without limitation, utilizing elements such as those commonly associated with a microprocessor, central processing unit (CPU), digital signal processor (DSP), application-specific integrated circuit (ASIC), or other type of data processing device, as well as portions and combinations of such elements.

Also, the system 600 and network processor 602 as illustrated in FIGS. 6 and 7 may include other elements in addition to or in place of those specifically shown, including one or more elements of a type commonly found in a conventional implementation of such a system and network processor. For example, the network processor may include a classifier, queuing and dispatch logic, one or more memory controllers, interface circuitry for interfacing the network processor with the network 608, the switch fabric 610, a host processor or other external device(s), as well as other conventional elements not explicitly shown in the figure. These and other conventional elements, being well understood by those skilled in the art, are not described in detail herein.

The functionality of the network processor 602 as described herein may be implemented at least in part in the form of software program code. For example, elements associated with the performance of scheduling operations in the network processor may be implemented at least in part utilizing elements that are programmable via instructions or other software that may be supplied to the network processor via an external host processor or other suitable mechanism. For example, information characterizing particular scheduling algorithms, or associated traffic shaping information, may be supplied to the network processor from the associated host processor or other suitable mechanism.

Figure 8:
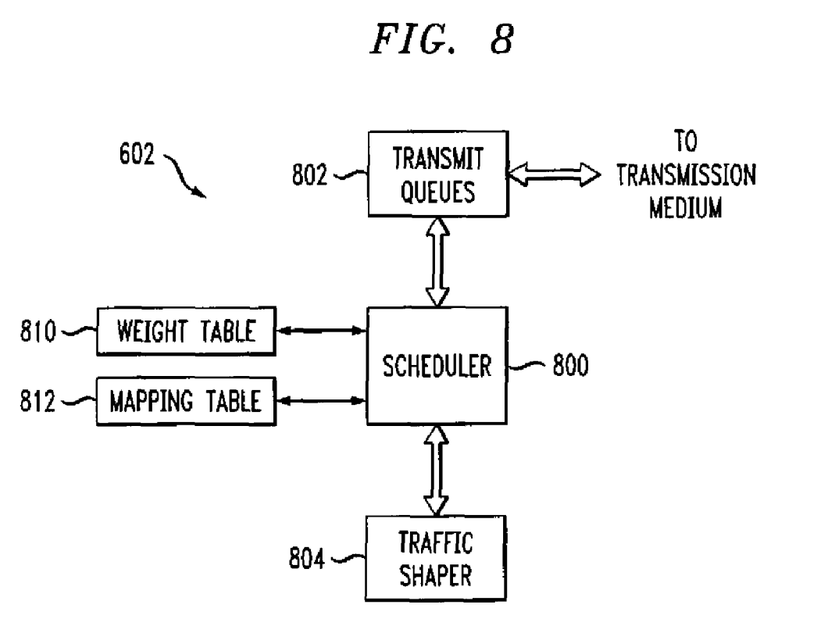
FIG. 8 is a more detailed view of a network processor of the FIG. 6 system configured in accordance with the techniques of the invention.

FIG. 8 shows a more detailed view of the network processor 602 in an illustrative embodiment of the invention. The network processor 602 in this embodiment includes a scheduler 800, transmit queues 802, a traffic shaper 804, a weight table 810, and a mapping table 812. In operation, the scheduler 800 schedules data blocks associated with the transmit queues 802 for transmission over one or more transmission media which are not explicitly shown. The scheduling utilizes the weight table 810 and mapping table 812, in conjunction with traffic shaping information from the traffic shaper 804 or without such information, in scheduling the data blocks associated with the transmit queues 802 for transmission.

As indicated previously, the network processor 602 may include additional elements, for example, of a type described in the above-cited U.S. patent applications, or of a conventional type known to those skilled in the art, and such elements, being described elsewhere, are not further described herein.

The weight table 810 and mapping table 812 may be stored at least in part in the internal memory 604 of the network processor 602, and may also or alternatively be stored at least in part in the external memory 606 of the network processor 602. When stored using internal memory, at least a portion of such memory may be internal to the scheduler 800 or other scheduling circuitry.

In addition to the table elements 810 and 812, scheduler 800 may include or otherwise have associated therewith a number of additional timeslot tables or other types of table elements suitable for use in static or dynamic table-based scheduling of a type described in the above-cited U.S. patent applications, or of a type known in conventional practice.

The transmit queues 802 may be viewed as comprising a plurality of transmission elements. For example, the transmit queues may comprise a plurality of transmission queues and associated control logic, with each of the transmission queues corresponding to a transmission element. It should be noted, however, that the term "transmission element" as used herein is intended to be construed more generally so as to encompass any source of one or more data blocks, or other elements that are schedulable for transmission in the network processor 602.

Packets or other data blocks can be enqueued in transmission elements of the transmit queues 802 from an associated network processor data path, not explicitly shown in the figure. This may occur in conjunction with packet enqueue messages and associated data blocks received from such a data path. Similarly, packets or other data blocks can be dequeued from the transmission elements to the data path upon transmission, for example, in conjunction with packet dequeue messages and associated data blocks being sent to the data path.

The traffic shaper 804 may be implemented, by way of example, as an otherwise conventional traffic shaping engine which establishes one or more traffic shaping requirements, in a known manner, for the transmission of the data blocks from the transmission elements of the transmit queues 802. The traffic shaper 804 may receive information regarding queue and scheduler status from the transmit queues 802 via the scheduler 800. The traffic shaper may generate traffic shaping information such as queue transmission interval and prioritization for establishing a class of service (CoS) or other desired service level for one or more of the transmission elements or their corresponding network connections.

As indicated above, in the network processor context the transmission elements, that is, the entities to be scheduled, may comprise queues. The present invention, however, can be used to schedule any type of elements for which data blocks are to be transmitted, and more generally any type of schedulable elements in a communication system processing device. Such elements are intended to be encompassed by the general term "transmission elements" as used herein, and as indicated previously may also be referred to herein as "users."

The scheduler 800 in the FIG. 8 embodiment is configured to implement a scheduling algorithm such as the above-described scheduling algorithms of FIGS. 3 and 4.

The schedulers 102 and 800 are illustrative examples of what is referred to more generally herein as "scheduling circuitry." In other embodiments, scheduling circuitry may include one or more tables or other arrangements of one or more of hardware, software and firmware capable of implementing the scheduling techniques described herein. Thus, although shown as separate from the scheduler 800 in the figure, the weight table 810 and the mapping table 812 or suitable portions thereof may be at least partially incorporated into scheduling circuitry or an associated memory in accordance with the invention.

The schedulers 102 and 800 may utilize any arrangement of logic gates, processing elements or other circuitry capable of providing scheduling functionality of the type described herein. Scheduling circuitry in accordance with the invention may thus comprise otherwise conventional general-purpose network processor circuitry which is adaptable under software control to provide at least a portion of a scheduling function in accordance with the invention. Numerous such circuitry arrangements will be readily apparent to those skilled in the art, and are therefore not described in detail herein.

As indicated above, a given embodiment of the present invention can be implemented as one or more integrated circuits. In such an arrangement, a plurality of identical die is typically formed in a repeated pattern on a surface of a wafer. Each die may include a device as described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

Again, it should be emphasized that the above-described embodiments of the invention are intended to be illustrative only. For example, although the illustrative embodiment of FIG. 8 utilizes a scheduler which is separate from its associated table or tables, these elements or portions thereof may be incorporated into scheduling circuitry in accordance with the invention. Similarly, although transmit queues 802 and traffic shaper 804 are described as being separate from scheduler 800 in conjunction with the FIG. 8 embodiment, the associated functionality may be implemented at least in part within scheduling circuitry in accordance with the invention. Other embodiments can use different types and arrangements of processing elements for implementing the described functionality. For example, the tables may be implemented in internal memory, external memory or combinations of internal and external memory. In the case of internal memory, at least a portion of such memory may be internal to the scheduling circuitry. The particular process steps of the scheduling algorithms may be varied in alternative embodiments, and a wide variety of different scheduling policies can be supported. These and numerous other alternative embodiments within the scope of the following claims will be apparent to those skilled in the art.

What is claimed is:

1. A method for scheduling data blocks for transmission from a plurality of transmission elements in timeslots in a communication system, the method comprising:
   determining for the transmission elements respective credit measures, each of said credit measures being a function of a reserved portion of an available bandwidth and a scheduled portion of said available bandwidth for a corresponding one of the transmission elements; and
   selecting one or more of the transmission elements for scheduling in a given one of the timeslots based on the credit measures.

2. The method of claim 1 wherein the transmission elements comprise respective queues.

3. The method of claim 1 wherein the determining and selecting steps are repeated for one or more additional timeslots.

4. The method of claim 1 wherein the selecting step comprises selecting for scheduling in the given timeslot a particular one of the transmission elements having a highest credit measure of the credit measures of the plurality of transmission elements.

5. The method of claim 1 wherein the credit measures are given by $C_i$, for values of i=1 to N, where N denotes the number of transmission elements in the plurality of transmission elements.

6. The method of claim 5 wherein the selecting step comprises selecting for scheduling in the given timeslot a particular one of the transmission elements having a highest value of $r_i C_i$, where $r_i$ is channel capacity of transmission element i.

7. The method of claim 5 further comprising the step of initializing the credit measures of the N transmission elements by setting the credit measures $C_i$ equal to respective designated values $C^0_i$, where $C^0_i \geq 0$.

8. The method of claim 5 further comprising the step of updating the credit measures of the N transmission elements in accordance with the equation $C_i = C_i + \phi_i \Delta t - S_i$, where $\phi_i$ is a reserved rate of transmission element i, $\Delta t$ is timeslot duration, and $S_i$ is a number of bits scheduled from transmission element i.

9. The method of claim 1 further including the step of initializing the credit measures to respective designated values prior to selecting a particular one of the transmission elements for scheduling in the given timeslot.

10. The method of claim 1 further including the step of updating the credit measures after selecting a particular one of the transmission elements for scheduling in the given timeslot.

11. The method of claim 1 wherein the credit measures are constrained to have non-negative values.

12. The method of claim 1 wherein the credit measures are constrained to not exceed designated maximum values.

13. The method of claim 1 wherein two or more of the transmission elements have different initial values for their respective credit measures.

14. The method of claim 1 wherein two or more of the transmission elements have different maximum values for their respective credit measures.

15. The method of claim 1 wherein if a particular one of the transmission elements does not have one or more data blocks to be scheduled for transmission, its credit measure if greater than its initial value is reset to its initial value.

16. The method of claim 1 wherein two or more of the transmission elements are selected for scheduling in the given timeslot based on said selected transmission elements having substantially the same credit measures, said selected transmission elements all being scheduled in the given timeslot by assigning different subsets of a set of available codes to different ones of said selected transmission elements.

17. An apparatus for scheduling data blocks for transmission from a plurality of transmission elements in timeslots in a communication system, the apparatus comprising:
a scheduler coupled to the transmission elements;
wherein the scheduler is configured to determine for the transmission elements respective credit measures, each of said credit measures being a function of a reserved portion of an available bandwidth and a scheduled portion of said available bandwidth for a corresponding one of the transmission elements, and to select one or more of the transmission elements for scheduling in a given one of the timeslots based on the credit measures.

18. The apparatus of claim 17 wherein the scheduler comprises scheduling circuitry implemented in a processing device of the communication system.

19. The apparatus of claim 18 wherein the processing device comprises a network processor integrated circuit.

20. An integrated circuit comprising:
a processing device having a scheduler configured to schedule data blocks for transmission from a plurality of transmission elements in timeslots in a communication system;
the scheduler being coupled to the transmission elements;
wherein the scheduler is configured to determine for the transmission elements respective credit measures, each of said credit measures being a function of a reserved portion of an available bandwidth and a scheduled portion of said available bandwidth for a corresponding one of the transmission elements, and to select one or more of the transmission elements for scheduling in a given one of the timeslots based on the credit measures.

21. The integrated circuit of claim 20 further comprising memory circuitry associated with said processing device and adapted for storage of one or more of said credit measures.

22. The integrated circuit of claim 20 wherein the scheduler is implemented at least in part in the form of software running on the processing device.

* * * * *